Feb. 11, 1930.                L. O. FRENCH                1,746,856
                               SPRAY NOZZLE
                             Filed May 6, 1927

INVENTOR
Louis O. French

Patented Feb. 11, 1930

1,746,856

UNITED STATES PATENT OFFICE

LOUIS O. FRENCH, OF MILWAUKEE, WISCONSIN

SPRAY NOZZLE

Application filed May 6, 1927. Serial No. 189,344.

The invention relates to spray nozzles and more particularly to spray nozzles for spraying fuel into the cylinder of an internal combustion engine or into passages communicating with the cylinder.

One object of this invention is to provide a spray nozzle which, due to the inherent elasticity of a tubular member forming one of the parts of the nozzle and seating at its open end portion against a relatively fixed seat, is either expanded or contracted under the pressure of the liquid to be sprayed to establish a spray opening between it and its fixed seat, the yield of the tubular member following the laws relating to hollow tubes rather than plates or flat surfaces.

A further object of the invention is to improve spray nozzles of the type in which the inherent elasticity of one of the members is used to establish a spraying orifice by limiting the extent to which the yieldable member of the nozzle may expand or contract so that the elastic limit of said member is not exceeded and so that the extent of spray opening may be accurately controlled.

The invention further consists in the several features hereinafter set forth and more particularly defined by claims at the conclusion hereof.

In the drawings Fig. 1 is a vertical sectional view through a spray nozzle embodying the invention;

Figure 1:
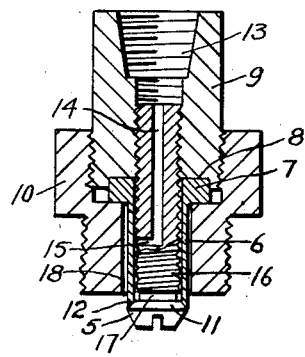

Referring to Fig. 1, the nozzle consists of the relatively fixed abutment 5 and the yieldable member 6.

The yieldable member 6 is a tube of suitable elastic or resilient metal, such as tool steel, here shown as provided with a flange 7 seating in a recess 8 in a conduit section 9 and clamped thereto in a fluid-tight manner by a flanged nut 10.

The abutment 5 is in the form of a screw having an inclined seat 11 against which the open end or inclined edge 12 of the tube 6 seats, said screw having tight threaded engagement with the conduit section 7 and adapted to be turned to bring its seat against said edge 12 and exert or produce an initial tension in the walls of the tube determined by the adjustment of said screw.

The upper end 13 of the conduit section 9 is threaded to receive the liquid or fuel supply pipe (not shown) connected with any suitable pumping system, the fuel passing down through said conduit, through a central bore 14 and transverse opening 15 in said screw and thence through the convolutions or spiral grooves 16, which impart a spiral motion to the fuel jet, to a space 17 adjacent its seat and by reason of its pressure causing said tube to expand, thus moving off its seat slightly and establishing an annular spray orifice so long as fluid under pressure is delivered thereto which in an injection type internal combustion engine is for a predetermined time in the engine's cycle.

In order to prevent the tube 6 expanding beyond its elastic limit and also to accurately gauge the size of the spraying orifice established between the parts 5 and 6, the nut 10 is provided with a tubular extension 18 surrounding said tube, at least at its lower end, and spaced only a slight distance therefrom as, for example, from one to two-thousandths of an inch and as this amount is so small the elastic limit of the tube will not be exceeded.

Figure 2:
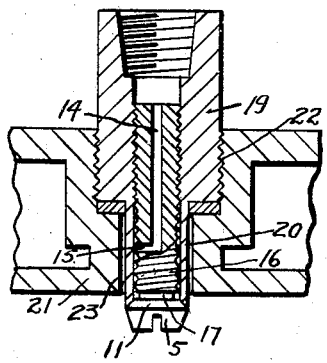
Fig. 2 is a view similar to Fig. 1, showing certain modifications in construction.

By making the tube 6 separate from the conduit its open end may be readily ground to a perfect fit with the seat 11 and the tube may be readily replaced if necessary. However, the tube 6 and conduit section 7 may be made in one piece to reduce the number of parts and such construction is shown in Fig. 2 wherein the member 19 has a tubular end 20 corresponding to the tube 6 and the abutment 5 cooperates with said end in the same manner as in the previous construction. The construction has also been further simplified by mounting the member 19 directly in the cylinder head 21 or other part of the engine by a threaded engagement 22 therewith and the opening 23 in said head is such as to limit the extent of expansion of the tubular end 20.

Figure 3:
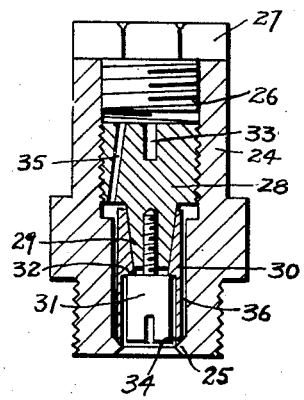
Fig. 3 is a vertical sectional view of another form of spray nozzle embodying the invention.

Instead of the tube expanding to establish a spray orifice the same may be caused to contract to accomplish this result and Fig. 3 shows a construction suitable for this purpose comprising a casing or conduit section 24 provided with an inwardly extending flange forming a seat 25 and with a bore 26 threaded for a portion of its length to receive a cap-nut 27, and a screw 28 having a tapered end 29 upon which the upper tapered end of a tube 30 is mounted and firmly held by a screw 31 engaging a shoulder 32 on said tube and having threaded engagement with the screw 28. The screw 28 has a tight thread engagement with the section 24 and has a cross slot 33 for taking a screw driver or other suitable tool whereby turning said screw will bring the inclined edge 34 of the tube 30 into seating engagement with the seat 25 and will produce an initial tension in said tube.

In this construction fuel introduced from a suitable pumping system by a pipe (not shown) connected with a passage in the cap-nut 27 passes through the conduit 24 by way of a passage 35 in screw 28, and space 36 and exerts pressure on the tube 30, causing it to contract and thereby move away from the seat 25 to establish an annular spraying orifice and the extent of contraction is limited in this instance by the head of the screw 31 whose sides are spaced from the interior of the tube to a predetermined extent. As the spray opening thus determined is small the elastic limit of the tube will not be exceeded.

In all of the above constructions it will be noted that the expansion or contraction of the tubular member forming the nozzle will act to establish a spray orifice. In Figs. 1 and 2 a conical spreading jet will be formed and in Fig. 3 a conical jet that first converges to a point below the nozzle and then diverges thereof. Where the nozzle is used for spraying fuel into the combustion space of an internal combustion engine the inclination of the seat relative to the yieldable tube may be varied to suit the shape of the combustion chamber, this inclination, for example, being very slight when said space is formed between a relatively flat head and piston.

Upon the amount of fuel pressure employed the thickness of the wall of the tube as well as the characteristics of the metal forming this wall necessary to cause said tube to expand or contract to establish the spraying orifice, will depend, but inasmuch as the fuel delivery pressure may range from one thousand to fifteen thousand pounds per square inch this wall may be of a thickness which will readily stand up in service, for example, one sixty-fourth to a thirty-second of an inch or more, depending upon the fuel pressure employed and its serviceability is further increased by positively limiting its expansion or contraction to an amount well within the elastic limits of the material used in the manner previously described.

It will be noted that the tube is cooled throughout its length by the fuel passing through or around it. While the yieldable tube has been shown of uniform thickness, it may be tapered toward its seating edge or open end portion, if desired.

I desire it to be understood that this invention is not to be limited to any particular form or arrangement of parts except in so far as such limitations are specified in the claims or necessitated by the prior art.

What I claim as my invention is:

1. In a spray nozzle, the combination of a relatively fixed abutment, and a tube of yieldable metal having at its terminal an annular seating surface inclined from the axis of said tube normally engaging said abutment in sealing relation, said tube having a substantially smooth bore in advance of said seating surface and due to the inherent elasticity of its side wall yieldable under pressure exerted against said wall by the liquid to be sprayed to establish a spraying opening between said seating surface and said abutment.

2. In a spray nozzle, the combination of a tube of yieldable metal having an open, annular, end portion, a fixed abutment having a sealing surface inclined downwardly and outwardly from the axis of said tube and with which said open end portion normally engages in sealing relation, said tube due to the inherent elasticity of its side wall yielding under pressure exerted against said wall by the liquid to be sprayed to establish a spraying opening between said end portion and said abutment.

3. In a spray nozzle, the combination of a yieldable metal tube having an open, annular, end portion, and a relatively fixed abutment normally in wedging engagement with said open end portion, said tube having a substantially smooth bore portion in advance of said open end, whose wall, due to its inherent elasticity, is yieldable under pressure exerted against it by the liquid to be sprayed to establish a spraying opening between said end portion and said abutment.

4. In a spray nozzle, the combination of a relatively fixed abutment, a yieldable metal member seating on said abutment and due to its inherent elasticity movable therefrom to establish a spray opening under the action of the liquid to be sprayed upon said yieldable member, and non-yielding means for positively limiting the extent of yield of said yieldable member to determine the extent of said spray opening.

5. In a spray nozzle, the combination of a relatively fixed abutment, a yieldable metal member seated on said abutment and movable therefrom to establish a spray opening under the action of liquid to be sprayed upon said yieldable member, and means for positively limiting the extent of yield of said yieldable member to an amount within the elastic limits of its molecular structure.

6. In a spray nozzle, the combination of a removable tube of yieldable metal forming the exposed end of a pressure conduit, a relatively fixed abutment normally in sealing engagement with the open end portion of said tube, said tube having a substantially smooth bore in advance of said open end, whose wall, due to its inherent elasticity, serves to store pressure energy in said conduit and release the fluid by the circumferential, expansive movement of said open end away from said abutment, and means for mounting said abutment in adjustable relation with said tube to produce an initial tension in said tube.

7. In a valve construction, the combination with a casing member forming a conduit, of a removable tube of yieldable metal forming the end of a pressure conduit and provided with a shoulder portion, casing means engaging the shoulder portion and in threaded engagement with said first named casing member to detachably secure said tube to said casing member, and a relatively fixed abutment normally in sealing engagement with the open end portion of said tube, said tube having a substantially smooth bore in advance of said open end, whose wall, due to its inherent elasticity, serving to store pressure energy in said conduit and release the fluid by the movement of said open end away from said abutment.

In testimony whereof, I affix my signature.

LOUIS O. FRENCH.